US012530350B2

(12) United States Patent
Pan

(10) Patent No.: US 12,530,350 B2
(45) Date of Patent: Jan. 20, 2026

(54) BOTTLENECK AWARE QUERY ALTERATION FOR SEARCH

(71) Applicant: Microsoft Technology Licensing, LLC, Redmond, WA (US)

(72) Inventor: Yi-Cheng Pan, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 18/101,849

(22) Filed: Jan. 26, 2023

(65) Prior Publication Data

US 2024/0256536 A1    Aug. 1, 2024

(51) Int. Cl.
*G06F 16/2453* (2019.01)
*G06F 16/9535* (2019.01)

(52) U.S. Cl.
CPC .... *G06F 16/24534* (2019.01); *G06F 16/9535* (2019.01)

(58) Field of Classification Search
CPC .......... G06F 16/24534; G06F 16/9535; G06F 16/9536; G06F 16/9538; G06F 16/24578; G06F 16/3338; G06F 16/319; G06F 16/9032; G06F 16/90335; G06F 40/10; G06F 16/3346; G06F 16/313; G06F 16/3322; G06F 16/9532; G06F 16/9038; G06F 16/248
See application file for complete search history.

(56) References Cited

U.S. PATENT DOCUMENTS 8,849,785 B1* 9/2014 Shattuck .............. G06F 16/951
707/706
2008/0046405 A1  2/2008 Olds et al.
2009/0171929 A1  7/2009 Jing et al.
2011/0295897 A1  12/2011 Gao et al.
(Continued)

FOREIGN PATENT DOCUMENTS

EP        1587011 A1    10/2005

OTHER PUBLICATIONS

Liu et al. "Bottleneck-Aware Coflow Scheduling Without Prior Knowledge" IEEE Infocom 2020-IEEE Conference on Computer Communications . . . , 2020-ieeexplore.ieee.org (Year: 2020).*
(Continued)

*Primary Examiner* — Ajay M Bhatia
*Assistant Examiner* — Berhanu Mitiku

(57) ABSTRACT

Systems and methods for resolving a performance bottleneck of a query search to improve search results are provided. In particular, a computing device may receive a user search query from a user, generate query alteration candidates based on the user search query using an index-based language model, determine whether the user search query includes a bottleneck term that is likely to cause the performance bottleneck of the query search, wherein the bottleneck term includes one or more words or phrases, optimize, in response to determination that the user search query includes the bottleneck term, the query alteration candidates to resolve the performance bottleneck, update the index-based language model by updating confidence scores asso-
(Continued)

ciated with the query alteration candidates, generate search results based on the optimized query alteration candidates, and provide the search results to the user.

20 Claims, 7 Drawing Sheets

(56) References Cited

U.S. PATENT DOCUMENTS

| | | | |
|---|---|---|---|
| 2012/0131031 A1* | 5/2012 | Xie | G06F 16/3338 707/765 |
| 2012/0233140 A1* | 9/2012 | Collins-Thompson | G06F 16/3338 707/706 |
| 2016/0188619 A1 | 6/2016 | Su | |
| 2018/0373758 A1* | 12/2018 | Obradovic | G06F 11/3433 |
| 2019/0324780 A1 | 10/2019 | Zhu et al. | |
| 2020/0334307 A1* | 10/2020 | Prasad | G06F 16/9532 |

OTHER PUBLICATIONS

Sen et al. "Query Optimization Time: The New Bottleneck in Real-time Analytics" IMDM '15, Aug. 31, 2015, Kohala Coast, HI, USA ACM 978-1-4503-3713-7/15/08 (Year: 2015).*

Yu et al. "Search Result Diversification Using Query Aspects as Bottlenecks" Proceedings of the 32nd ACM International Conference on Information and Knowledge Management (CIKM '23), Oct. 21-25, 2023, Birmingham, United Kingdom. (Year: 2023).*

International Preliminary Report on Patentability (Chapter I) received for PCT Application No. PCT/US2023/086124, mailed on Aug. 7, 2025, 07 pages.

* cited by examiner

BOTTLENECK AWARE QUERY ALTERATION FOR SEARCH

BACKGROUND

Search engines are utilized to maximize the likelihood of locating relevant information amongst an abundance of data. Upon receipt of a search query from a user, the search engines retrieve a list of search results that match the search query and are typically ranked based on relevance. Often, the search query may not be fully successful in retrieving relevant information because the search query may use terms that are not contained in or otherwise associated with the relevant information. For example, the search query may return no search result if the search query includes a spelling error, over-specifying term, synonym, hypernym, and/or acronym.

To address this situation, search engines commonly provide an alteration module which modifies the search query to make it more effective in retrieving the relevant information. Such modification may include adding one or more terms to the original search query, removing one or more terms from the original search query, replacing one or more terms in the original search query with other terms, and/or correcting one or more terms in the original search query. More specifically, such modification may include spelling correction, selective stemming, acronym normalization, and/or query expansion (e.g., by adding synonyms, etc.). There may be multiple query alteration candidates for the original search query but only a limited number of query alteration candidates may be selected for search due to search machine cost, latency, and intent ambiguities. However, even with such modifications, search results are not guaranteed. In other words, the search engines need to conduct the full search with the original or altered search query to find out whether the respective search query will return search results.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

The present disclosure relates to a query search engine that provides search results based on a user search query by optimizing query alteration candidates. More particularly, the present disclosure teaches the ability to resolve a performance bottleneck of the query search by identifying one or more searchable terms in the user search query and the query alteration candidates that are likely to return no search result.

In accordance with at least one example of the present disclosure, method for resolving a performance bottleneck of a query search to improve search results is provided. The method may include receiving a user search query from a user, generating query alteration candidates based on the user search query, determining whether the user search query includes a bottleneck term that is likely to cause the performance bottleneck of the query search, wherein the bottleneck term includes one or more words or phrases, optimizing, in response to determining that the user search query includes the bottleneck term, the query alteration candidates to resolve the performance bottleneck, generating search results based on the optimized query alteration candidates, and providing the search results to the user.

In accordance with at least one example of the present disclosure, a computing device for resolving a performance bottleneck of a query search to improve search results is provided. The computing device may include a processor and a memory having a plurality of instructions stored thereon that, when executed by the processor, causes the computing device to receive a user search query from a user, generate query alteration candidates based on the user search query using an index-based language model, determine whether the user search query includes a bottleneck term that is likely to cause the performance bottleneck of the query search, wherein the bottleneck term includes one or more words or phrases, optimize, in response to determination that the user search query includes the bottleneck term, the query alteration candidates to resolve the performance bottleneck, update the index-based language model by updating confidence scores associated with the query alteration candidates, generate search results based on the optimized query alteration candidates, and provide the search results to the user.

In accordance with at least one example of the present disclosure, a non-transitory computer-readable medium storing instructions for resolving a performance bottleneck of a query search to improve search results is provided. The instructions when executed by one or more processors of a computing device, cause the computing device to receive a user search query from a user, generate query alteration candidates based on the user search query, determine whether the user search query includes a bottleneck term that is likely to cause the performance bottleneck of the query search, wherein the bottleneck term includes one or more words or phrases, optimize, in response to determination that the user search query includes the bottleneck term, the query alteration candidates to resolve the performance bottleneck, generate search results based on the optimized query alteration candidates, and provide the search results to the user.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
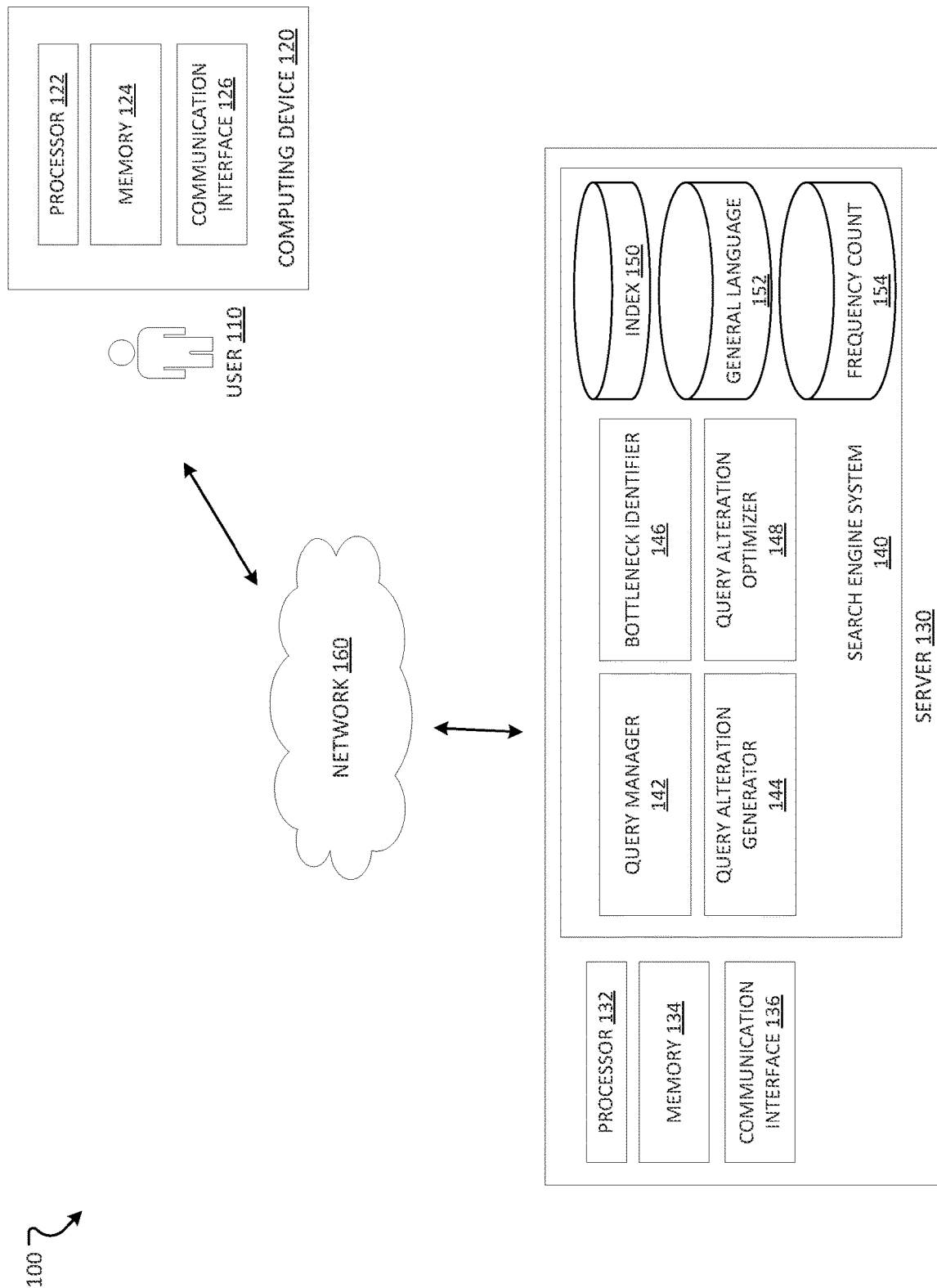
FIG. 1 depicts a block diagram of an example of an operating environment in which a search engine system may be implemented in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Traditional query alteration techniques are created to mitigate a gap between user's query and the underlying index in an effort to return more relevant search results. Such gap may occur with spelling errors, over-specifying terms, synonyms, hypernyms, acronyms and so on. The traditional query alteration techniques may leverage backend index together with generic language information to train an index-based language model. At runtime, given a user search query and the trained language model, a list of query alteration candidates is generated. Such alteration may include adding one or more terms to the original search query, removing one or more terms from the original search query, replacing one or more terms in the original search query with other terms, and/or correcting one or more terms in the original search query. More specifically, such alteration may include spelling correction, selective stemming, acronym normalization, and/or query expansion (e.g., by adding synonyms, etc.).

Since the query alteration candidates are based on the index-based language model, the query alteration candidates are likely be more similar to the index and, thereby making the gap smaller. However, there is no guarantee that the gap will be smaller enough to satisfy the search goal of the user search query. For example, if the original user search query leads to no results, after the traditional query alteration techniques, it is still uncertain whether the query alteration candidates are going to return search results prior to conducting the full search. In other words, the gap may be smaller after alteration but may still be too big to return any results. If the query alteration candidates still return no results, from the user's perspectives, the search still fails and query alteration did not improve the search.

In accordance with examples of the present disclosure, a query search engine conducts a search based on a user search query to provide search results by optimizing query alteration candidates. More particularly, the present disclosure teaches the ability to resolve a performance bottleneck of the query search by identifying one or more searchable terms in the user search query and the query alteration candidates that are likely to return no search result.

To do so, the query search engine generates query alteration candidates based on a user search query using an index-based language model in an effort to improve search results and resolve any performance bottleneck of the query search. If the user search query includes a searchable term that is likely to lead to no search result, the searchable term is identified as a bottleneck term. It should be appreciated that the searchable term and the bottleneck term may be one or more words or one or more phrases. The query search engine determines whether the query alteration candidates can resolve the identified bottleneck term and, if so, the query search engine further determines whether those query alteration candidates create any new bottleneck. If a given query alteration candidate is able to resolve all earlier bottlenecks while not introducing any new bottlenecks, the query search engine increases a confidence score associated with the given query alteration candidate, which is used to optimize the query alteration candidates for the query search. In other words, the optimization of the query alteration candidates allows the query search engine to focus only on those query alteration candidates that are more likely to return search results. This may reduce a number of requests that are sent to a search stack, thereby not wasting query per second (QPS) to serve those query alteration candidates that cannot improve no results in the search stack.

It should be appreciated that although, for exemplarily purposes, described embodiments generally relate to productivity applications, and more particularly, presentation applications, the present methods and systems are not so limited. For example, the design difference captioning tool described herein may also provide design difference captioning for describing the differences between a pair of documents.

FIG. 1 depicts a block diagram of an example of an operating environment 100 in which a query search tool may be implemented in accordance with examples of the present disclosure. To do so, the operating environment 100 includes a computing device 120 associated with the user 110 and a server 130 that is communicatively coupled to the computing device 120 via a network 160. The network 160 may include any kind of computing network including, without limitation, a wired or wireless local area network (LAN), a wired or wireless wide area network (WAN), and/or the Internet. The computing device 120 includes a processor 122, a memory 124, and a communication interface 126. The computing device 120 may be used to receive a user search query from the user 110 and transmit the user search query to the server 130 via the network 160.

The server 130 includes a processor 132, a memory 134, a communication interface 136, and a search engine system 140. The search engine system 140 is configured to provide search results by generating query alteration candidates based on a user search query using an index-based language model in an effort to improve search results and resolve any performance bottleneck of the query search. To do so, the search engine system 140 further includes a query manager 142, a query alteration generation 144, a bottleneck identifier 146, and a query alteration optimizer 148.

The query manager 142 is configured to receive a search query from a user (e.g., 110) and analyze the user search query to identify one or more searchable terms in the user search query. A searchable term may be one or more words or one or more phrases. The query manager 142 is further configured to generate a notification to the user if the user search query and query alteration candidates associated with the user search query are likely to lead to no search results. The notification may indicate that search results cannot be returned because of one or more searchable terms in the user search query, also referred to as bottleneck terms. It should be appreciated that the searchable term and the bottleneck term may be one or more words or one or more phrases.

Additionally, the query manager 142 is further configured to update the index 150 associated with the language model by updating confidence scores of the query alteration candidates. For example, the query manager 142 is configured to decrease the confidence scores of those query alteration candidates that do not resolve the performance bottleneck of the search query or create a new performance bottleneck. The query manager 142 is configured to increase the confidence scores of those query alteration candidates that resolve the existing performance bottleneck and do not further create a new performance bottleneck. It should be appreciated that the updated confidence scores of the query alteration candidates are used to re-rank and optimize the query alteration candidates for generating search results. Moreover, upon generating search results based on the user search query, the query manager 142 is configured to increase frequency counts of searchable terms associated with the user search query and/or the query alteration candidates that were used to return the search results in a frequency count database 154.

The query alteration generator 144 is configured to generate query alteration candidates based on the user search query using an index-based language model. More specifically, the query alteration generator 144 is configured to generate the query alteration candidates that may mitigate a gap between the user search query and underlying index (e.g., 150) in an effort to return more relevant search results. Such gap may occur with spelling errors, over-specifying terms, synonyms, hypernyms, acronyms. The index-based language model is trained using backend index 150 together with generic language information (e.g., 152). At runtime, given the user search query and the trained language model, the query alteration generator 144 generates a list of query alteration candidates. Such alteration may include adding one or more terms to the original search query, removing one or more terms from the original search query, replacing one or more terms in the original search query with other terms, and/or correcting one or more terms in the original search query. More specifically, such alteration may include spelling correction, selective stemming, acronym normalization, and/or query expansion (e.g., by adding synonyms, etc.). The query alteration generator 144 is further configured to rank the query alteration candidates based on confidence scores associated with the respective query alteration candidates. The confidence score of a query alteration candidate indicates a degree of success or failure that search results generated based on the query alteration candidate meets the search goal of the user search query. For example, a lower confidence score of a query alteration candidate indicates a higher likelihood of returning no search result based on the respective query alteration candidate.

The bottleneck identifier 146 is configured to identify one or more bottleneck terms that are likely to cause a performance bottleneck of the query search based on the user search query. The bottleneck terms are one or more searchable terms in the user search query and/or the query alteration candidates that are likely to return no search result. It should be appreciated that the searchable term and the bottleneck term may be one or more words or one or more phrases. For example, if given a user search query {json xl print}, each of the three words 'json', 'xl', and 'print' is not bottlenecks since all of them individually have enough frequency observed. However, the bottleneck identifier 146 may identify the searchable terms 'json xl' and 'xl print' as bottlenecks if the bottleneck identifier 146 determines that those searchable terms never show up together in the index.

To identify one or more bottleneck terms, the bottleneck identifier 146 determines if frequency counts of the searchable terms exceeds a predetermined bottleneck threshold. The frequency counts of searchable terms in previous search queries are stored in the frequency count database 154 and indicate how often the searchable terms have been included in the previous search queries that returned search results based on the previous search queries. For example, the frequency count may be a pure count (i.e., a number of times that query alteration optimizer 148 the respective searchable term has been included in the previous search queries that returned search results). If a particular searchable term has a frequency count of zero, it means that the particular searchable term has not been included in the previous search queries that returned search results.

If the bottleneck identifier 146 determines that the frequency count of a respective searchable term does not exceed the predetermined bottleneck threshold, the bottleneck identifier 146 determines that the respective searchable term has a very low probability of returning search results (i.e., a high probability of returning no result) and identifies it as a bottleneck term. If, however, the bottleneck identifier 146 determines that the frequency count of a respective searchable term exceeds the predetermined bottleneck threshold, the bottleneck identifier 146 determines that the respective searchable term is likely to return search results and, therefore, is not considered to be a bottleneck term.

The query alteration optimizer 148 is configured to optimize the query alteration candidates to resolve a performance bottleneck of the query search based on the user search query. To do so, the query alteration optimizer 148 is configured to select one or more query alteration candidates associated with the user search query and determine whether the selected query alteration candidates resolve one or more searchable terms in the user search query that are identified as a performance bottleneck (i.e., the bottleneck terms). In other words, the query alteration optimizer 148 determines whether the query alteration candidates exclude the bottleneck terms identified in the user search query. The query alteration optimizer 148 is further configured to determine whether the one or more selected query alteration candidates create a new performance bottleneck if the bottleneck terms in the user search query are resolved by the one or more selected query alteration candidates. The query alteration optimizer 148 is configured to generate an optimized list of the query alteration candidates, also referred to as optimized query alteration candidates, that includes one or more query alteration candidates that resolve any existing performance bottleneck in the user search query and do not further create a new performance bottleneck. In the example above, if the bottleneck identifier 146 identifies the searchable terms 'json xl' and 'xl print' as bottlenecks, the query alteration optimizer 148 may modify the user search query from {json xl print} to {json xml print} to resolve all bottlenecks.

In some aspects, the query alteration optimizer 148 may select query alteration candidates that have confidence scores higher than a confidence score threshold. Alternatively, in some aspects, the search engine system 140 may select a predetermined number of query alteration candidates based on the confidence score. For example, the search engine system 140 may select five query alteration candidates that have the top five highest confidence scores. It should be appreciated that the confidence scores of the query alteration candidates are updated based on its ability to resolve a performance bottleneck associated with the user search query. It should be appreciated that, in some aspects, all query alteration candidates may be selected.

Figure 2A:
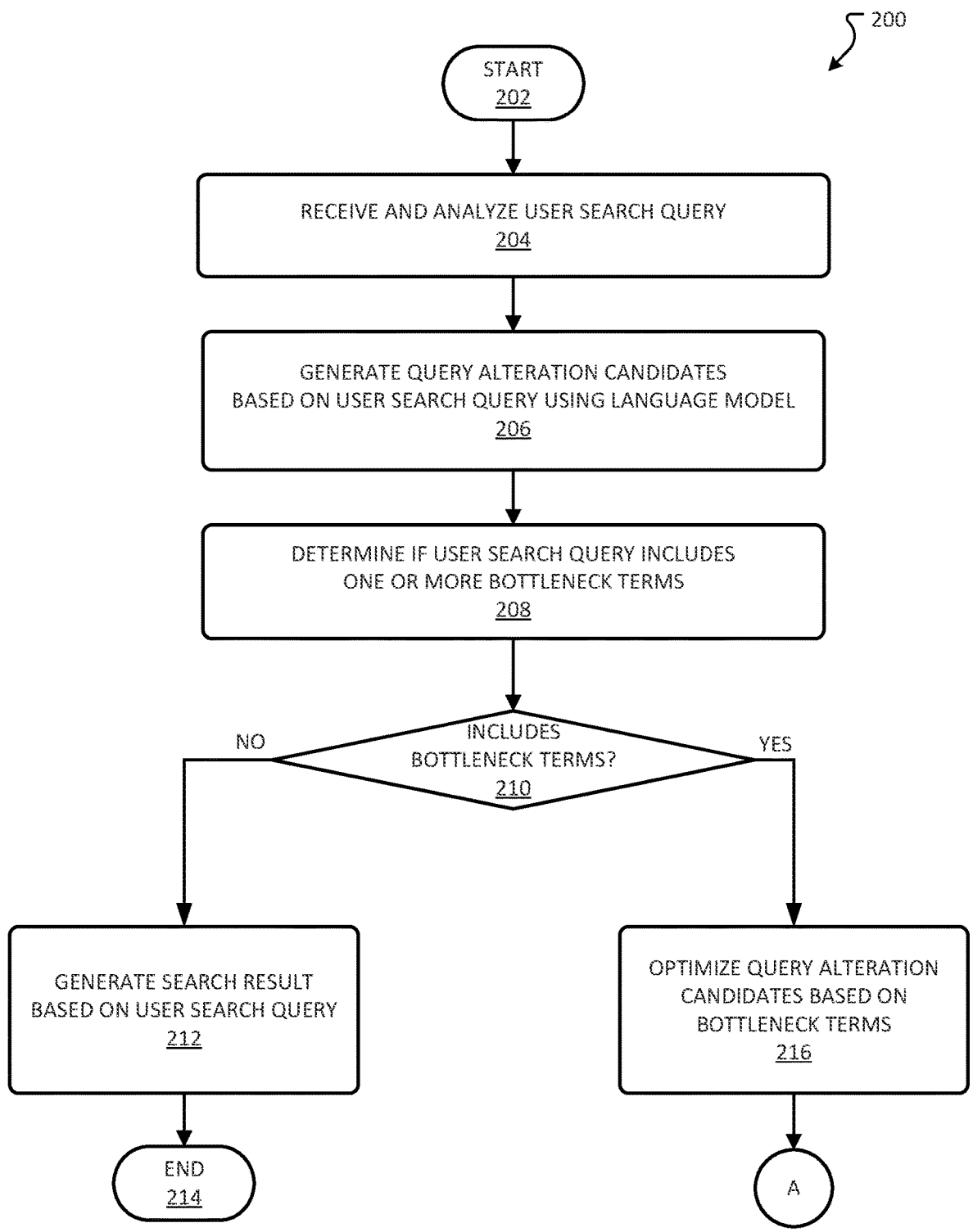
FIGS. 2A and 2B depict a flowchart of an example method of providing search results based on a user search query by generating and optimizing query alteration candidates in accordance with examples of the present disclosure.
Figure 2B:
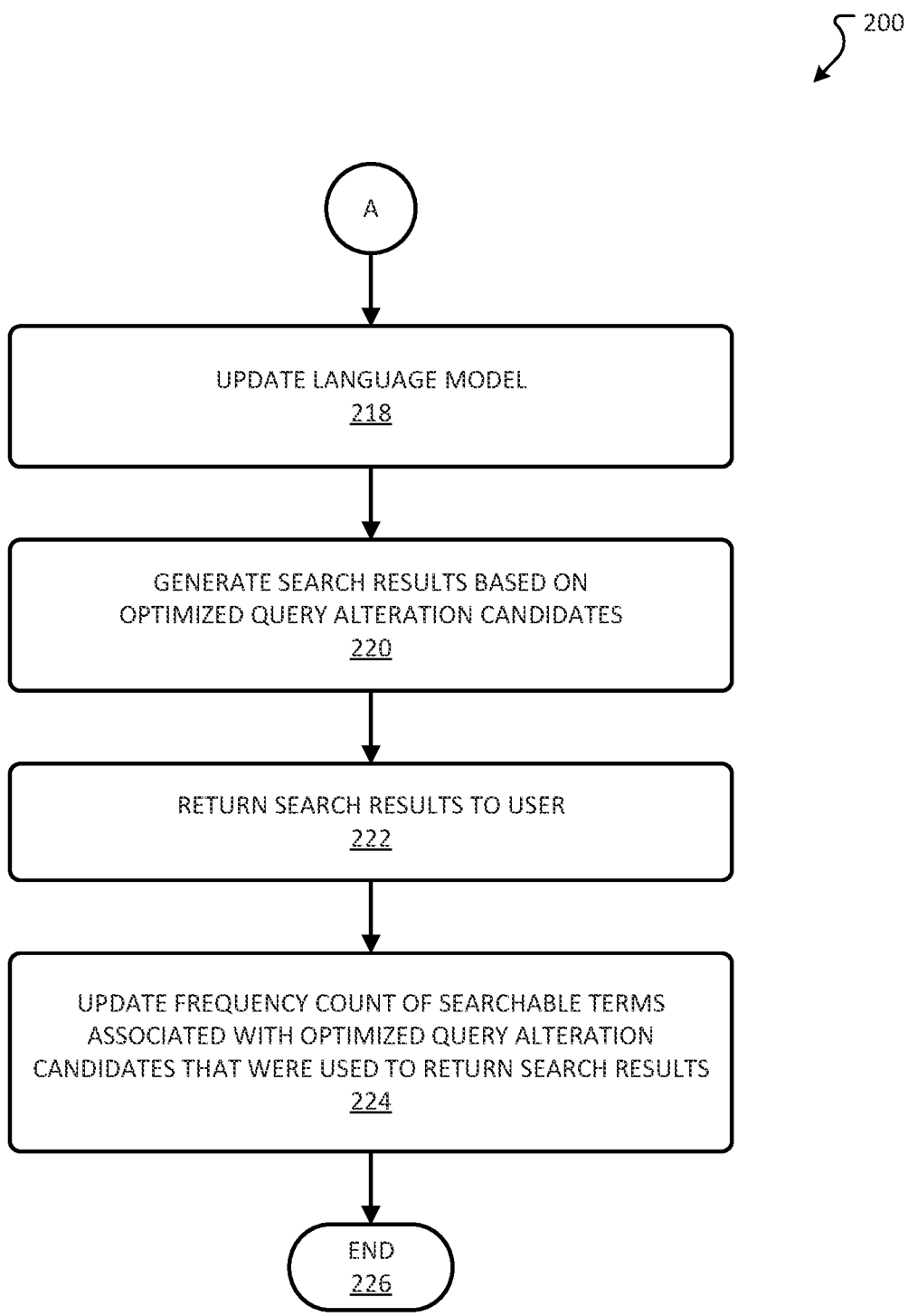

Referring now to FIGS. 2A and 2B, a method 200 for generating optimized query alteration candidates based on a user search query to improve query search results in accordance with examples of the present disclosure is provided. A general order for the steps of the method 200 is shown in FIGS. 2A and 2B. Generally, the method 200 starts at 202 and ends at 226. The method 200 may include more or fewer steps or may arrange the order of the steps differently than those shown in FIGS. 2A and 2B. In the illustrative aspect, the method 200 is performed by a search engine (e.g., a search engine system 140). However, it should be appreciated that one or more steps of the method 200 may be performed by another device that is communicatively coupled to a computing device (e.g., 120) of a user (e.g., 110). For example, the computing device 120 may be, but is not limited to, a computer, a notebook, a laptop, a mobile device, a smartphone, a tablet, wearable, or any other suitable computing device that is capable of communicating with the server 130. For example, the server 130 may be any suitable computing device that is capable of communicating with the computing device 120. The method 200 can be executed as a set of computer-executable instructions executed by a computer system and encoded or stored on a computer readable medium. Further, the method 200 can be performed by gates or circuits associated with a processor, Application Specific Integrated Circuit (ASIC), a field programmable gate array (FPGA), a system on chip (SOC), or other hardware device. Hereinafter, the method 200 shall be explained with reference to the systems, components, modules, software, data structures, user interfaces, etc. described in conjunction with FIG. 1 and FIGS. 4-6.

The method 200 starts at 202, where flow may proceed to 204. At 204, the search engine system 140 receives a user search query from a user and analyzes the user search query. Subsequently, the search engine system 140 simultaneously performs steps 206 and 208. However, in some aspects, step 208 may be performed subsequent to step 206, or vice versa.

At 206, the search engine system 140 generates query alteration candidates based on the user search query using an index-based language model. The index-based language model is trained using backend index (e.g., 150) and general language information. For example, the query alteration candidates may satisfy at least one feature in a set of features specified by the index-based language model. The query alteration candidates may be ranked based on confidence scores associated with the respective query alteration candidates. The confidence score of a query alteration candidate indicates a degree of success or failure that search results generated based on the query alteration candidate meets the search goal of the user search query.

At 208, the search engine system 140 determines whether the user search query includes one or more bottleneck terms. As described above, the bottleneck terms are one or more searchable terms in the user search query that are likely to return no search result and, therefore, cause a performance bottleneck of the query search. It should be appreciated that the searchable term may be one or more words or one or more phrases.

To determine whether the user search query includes one or more bottleneck terms, the search engine system 140 determines if frequency counts of the searchable terms in the user search query exceeds a predetermined bottleneck threshold. As described above, the frequency count indicates how often the respective searchable term has been included in previous search queries that returned search results based on the previous search queries. For example, if a particular searchable term in the user search query has a frequency count of zero, it means that the particular searchable term has not been included in a user search query that returned search results. In other words, the particular searchable term with zero-frequency count has a very low probability of returning search result and a high probability of returning no search result and, therefore, considered to be a bottleneck term.

At 210, if the frequency count of searchable terms in the user search query exceeds the predetermined bottleneck threshold, the search engine system 140 determines that the user search query does not include a bottleneck. Subsequently, the method 200 advances to step 212 to perform the query search using the user search query to generate search results based on the user search query and return the search results to the user. The method 200 may end at 214.

If, however, the search engine system 140 determines that the frequency count of one or more searchable terms in the user search query does not exceed the predetermined bottleneck threshold at step 210, the search engine system 140 determines that the user search query includes one or more bottleneck terms. For example, if the predefined bottleneck threshold is set to zero and a searchable term in the user search query has a zero-frequency count, the search engine system 140 identifies the searchable term as a bottleneck term. Subsequent to determining one or more bottleneck terms in the user search query, the method 200 proceeds to step 216.

At 216, the search engine system 140 optimizes a list of the query alteration candidates to resolve the performance bottleneck of the query search. Optimization of the query alteration candidates is further described below in FIG. 3.

Subsequently, at 218 in FIG. 2B, the search engine system 140 updates the index-based language model. Specifically, the search engine system 140 updates the index-based language model based on updated confidence scores of the query alteration candidates, which is described above and further below in FIG. 3. As described above, the confidence scores of the query alteration candidates are used for ranking the query alteration candidates and may be updated based on whether the query alteration candidates resolve the existing bottleneck terms in the user search query or create a new bottleneck.

For example, the search engine system 140 may increase the confidence scores of the query alteration candidates that resolve an existing bottleneck in the user search query or do not create a new bottleneck (e.g., do not include a bottleneck term). As described above, the higher confidence score of a query alteration candidate indicates a higher likelihood that the search results generated using the respective query alteration candidate meets the search goal of the user search query. Additionally, the search engine system 140 may decrease the confidence scores of the query alteration candidates that do not resolve an existing bottleneck in the user search query or create a new bottleneck (e.g., by including one or more bottleneck terms). As described above, the lower confidence score of a query alteration candidate indicates a lower likelihood that the search results generated using the respective query alteration candidate meets the search goal of the user search query. In other words, the lower confidence score of the query alteration candidate indicates a higher likelihood of returning no search result based on the respective query alteration candidate.

Simultaneously, at 220, the search engine system 140 performs a query search based on the optimized query alteration candidates to generate search results. The optimized query alteration candidates are a list of query alteration candidates that are ranked based on the updated confidence scores. At 222, the search engine system 140 returns the search results to the user.

At 224, the search engine system 140 increases the frequency count of the searchable terms associated with the user search query and/or one or more query alteration candidates that were used to return the search result. The method 200 may end at 226.

Figure 3:
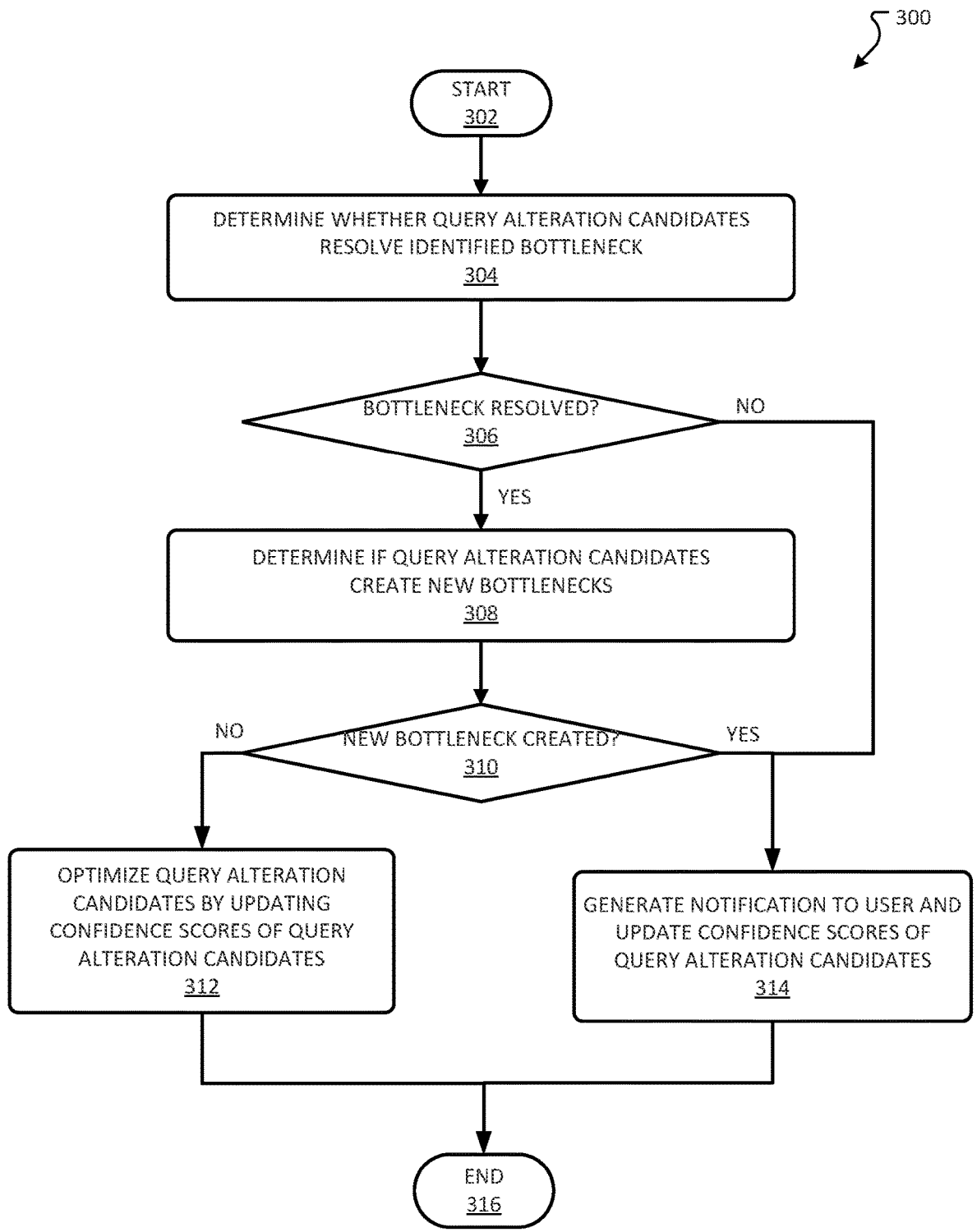
FIG. 3 depicts a flowchart of an example method of optimizing query alteration candidates to resolve a performance bottleneck of the query search based on the user search query in accordance with examples of the present disclosure.

Referring now to FIG. 3, a method 300 for optimizing query alteration candidates to resolve a performance bottleneck of a query search based on a user search query in accordance with examples of the present disclosure is provided. Generally, the method 300 illustrates a sequence of operations for optimizing query alteration candidates 216 of FIG. 2A. A general order for the steps of the method 300 is shown in FIG. 3. Generally, the method 300 starts at 302 and ends at 316. The method 300 may include more or fewer steps or may arrange the order of the steps differently than those shown in FIG. 3. In the illustrative aspect, the method 300 is performed by a search engine (e.g., a search engine system 140). However, it should be appreciated that one or more steps of the method 300 may be performed by another device that is communicatively coupled to a computing device (e.g., 120) of a user (e.g., 110). For example, the computing device 120 may be, but is not limited to, a computer, a notebook, a laptop, a mobile device, a smartphone, a tablet, wearable, or any other suitable computing device that is capable of communicating with the server 130. For example, the server 130 may be any suitable computing device that is capable of communicating with the computing device 120. The method 300 can be executed as a set of computer-executable instructions executed by a computer system and encoded or stored on a computer readable medium. Further, the method 300 can be performed by gates or circuits associated with a processor, Application Specific Integrated Circuit (ASIC), a field programmable gate array (FPGA), a system on chip (SOC), or other hardware device. Hereinafter, the method 300 shall be explained with reference to the systems, components, modules, software, data structures, user interfaces, etc. described in conjunction with FIG. 1 and FIGS. 4-6.

The method 300 starts at 302, where flow may proceed to 304. At 304, the search engine system 140 determines whether the query alteration candidates substitute one or more searchable terms in the user search query that are identified as bottleneck terms in step 208 in FIG. 2. In other words, the search engine system 140 determines whether the query alteration candidates exclude the identified bottleneck terms. To do so, in some aspects, the search engine system 140 may analyze all query alteration candidates. In some aspects, the search engine system 140 may select one or more query alteration candidates that have the confidence scores higher than a confidence score threshold. Alternatively, in some aspects, the search engine system 140 may select a predetermined number of query alteration candidates based on the confidence score. For example, the search engine system 140 may select five query alteration candidates that have the top five highest confidence scores.

The search engine system 140 determines that the performance bottleneck of the query search has not been resolved if the query alteration candidates include at least one identified bottleneck term. If the search engine system 140 determines that the bottleneck has not been resolved at 306, the method 300 advances ahead to step 314 to generate a notification to the user. The notification may indicate that the user search query includes one or more problematic terms (i.e., the one or more identified bottleneck terms) that lead to no results. Additionally, at step 314, the search engine system 140 updates an index database (e.g., 150) associated with an index-based language model that was used to generate the query alteration candidates to decrease the confidence scores of the query alteration candidates.

If, however, the search engine system 140 determines that the one or more query alteration candidates resolve the performance bottleneck identified in the user search query at 306, the method 300 proceeds to step 308. At 308, the search engine system 140 determines if the query alteration candidates that resolved the existing performance bottleneck create a new bottleneck. In other words, the search engine system 140 determines if the query alteration candidates that resolved the existing performance bottleneck include one or more searchable terms that are considered to be a bottleneck. To do so, the search engine system 140 determines whether the frequency counts of the searchable terms in the query alteration candidates exceeds a predetermined bottleneck threshold. In the illustrative embodiment, the predetermined bottleneck threshold is the same as the bottleneck threshold used to determine the bottleneck terms in the user search query. However, in some aspects, the bottleneck thresholds may be different.

The search engine system 140 determines a new bottleneck if all of the query alteration candidates that resolved the existing performance bottleneck include one or more searchable terms that has the frequency counts less than the predetermined bottleneck threshold. If a new bottleneck is identified at step 310, the method 300 advances to step 315 to generate a notification to the user including the one or more bottleneck terms in the user search query. The notification may indicate that there are one or more problematic terms (i.e., the one or more identified bottleneck terms) in the user search query that prevent returning search results. Additionally, at step 314, the search engine system 140 updates the index database (e.g., 150) to decrease the confidence scores of the query alteration candidates.

If, however, the search engine system 140 determines that at least one of the query alteration candidates that resolved the existing performance bottleneck does not create a new bottleneck, the method 300 proceeds to step 312. At 312, the search engine system 140 optimizes the query alteration candidates by updating the confidence scores of the query alteration candidates. For example, the search engine system 140 increases the confidence scores of those query alteration candidates that do not create a new bottleneck (i.e., do not include a bottleneck term). Additionally, the search engine system 140 decreases the confidence scores of those query alteration candidates that create a new bottleneck (i.e., include a bottleneck term). The updated confidence scores of the query alteration candidates are used to re-rank and optimize the query alteration candidates for generating search results in step 220 of FIG. 2. The method 300 may end at 316.

Figure 4:
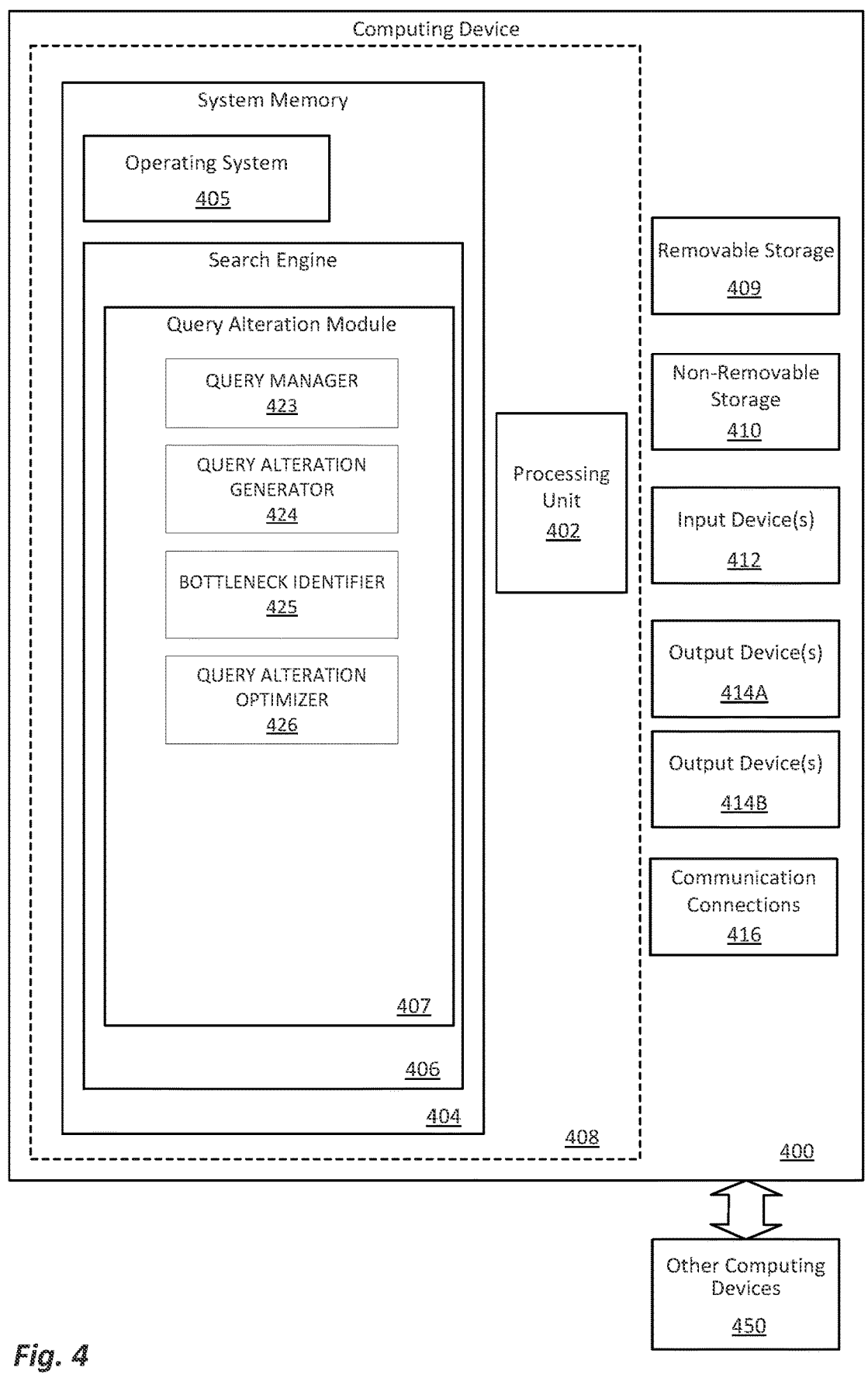
FIG. 4 depicts a block diagram illustrating physical components (e.g., hardware) of a computing device with which aspects of the disclosure may be practiced.
Figure 5:
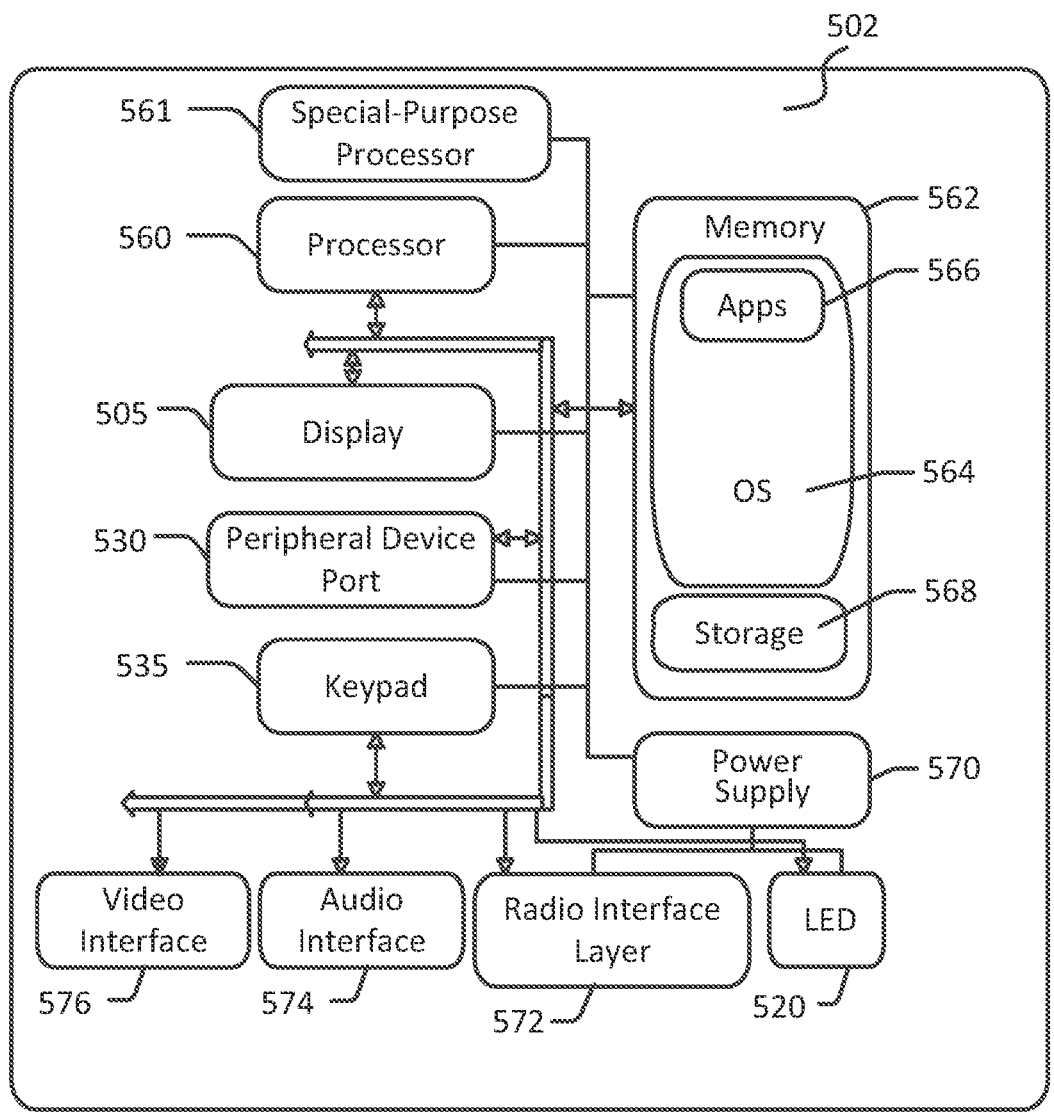
FIG. 5 illustrates a second example of a computing device with which aspects of the disclosure may be practiced.
Figure 6:
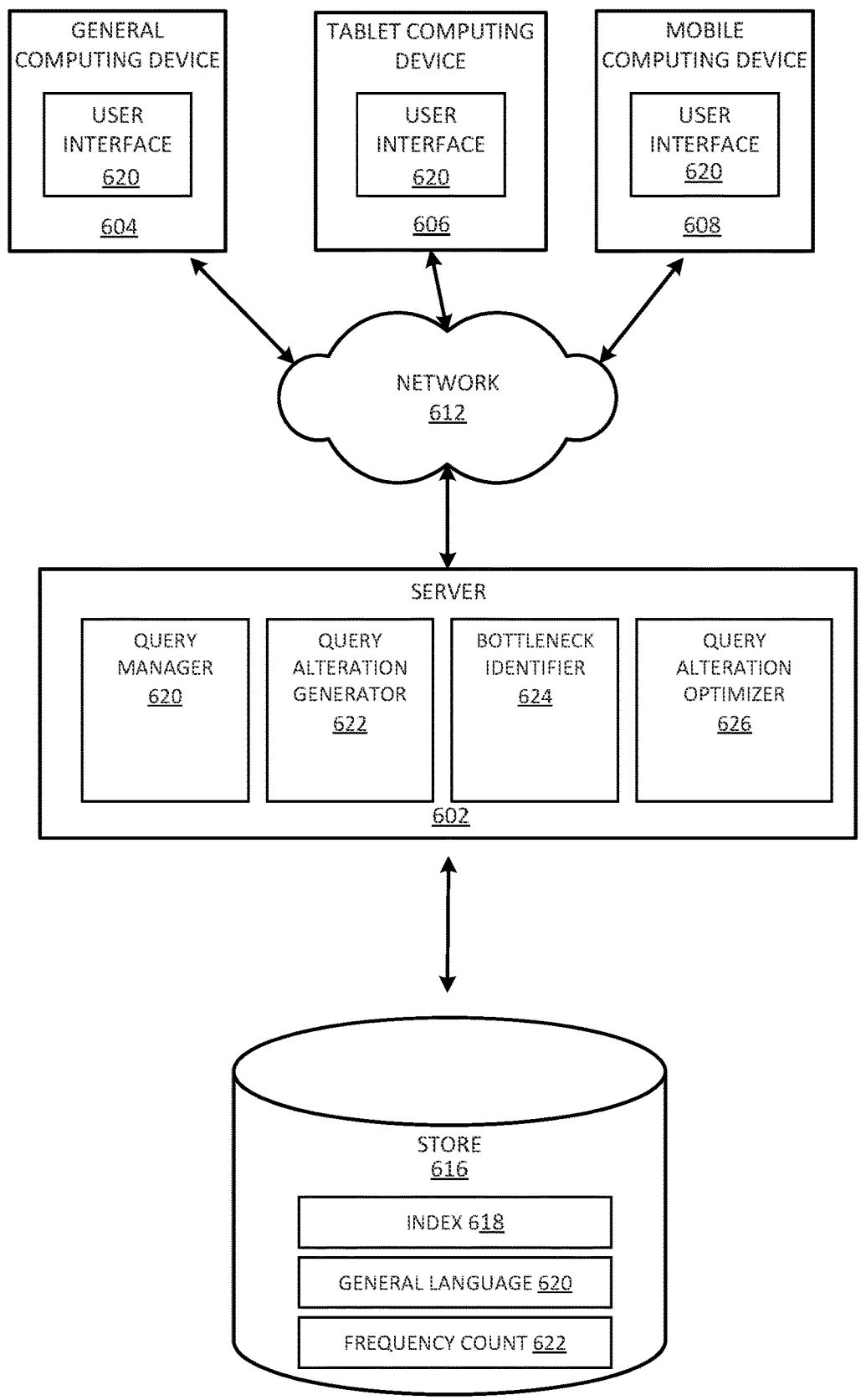
FIG. 6 illustrates at least one aspect of an architecture of a system for processing data in accordance with examples of the present disclosure.

FIGS. 4-6 and the associated descriptions provide a discussion of a variety of operating environments in which aspects of the disclosure may be practiced. However, the devices and systems illustrated and discussed with respect to FIGS. 4-6 are for purposes of example and illustration and are not limiting of a vast number of computing device configurations that may be utilized for practicing aspects of the disclosure, described herein.

FIG. 4 is a block diagram illustrating physical components (e.g., hardware) of a computing device 400 with which aspects of the disclosure may be practiced. The computing device components described below may be suitable for the computing devices described above. For example, the computing device 400 may represent the computing device 120 of FIG. 1. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories.

The system memory 404 may include an operating system 405 and one or more program modules 406 suitable for performing the various aspects disclosed herein such. The operating system 405, for example, may be suitable for controlling the operation of the computing device 400. Furthermore, aspects of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, several program modules and data files may be stored in the system memory 404. While executing on the at least one processing unit 402, the program modules 406 may perform processes including, but not limited to, one or more aspects, as described herein. The application 407 includes a query manager 423, a query alteration generator 424, a bottleneck identifier 425, and a query alteration optimizer 426, as described in more detail with regard to FIG. 1. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. The output device(s) 414A such as a display, speakers, a printer, etc. may also be included. An output 414B, corresponding to a virtual display may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 5 is a block diagram illustrating the architecture of one aspect of computing device, a server, or a mobile computing device. That is, the mobile computing device 500 can incorporate a system 502 (e.g., an architecture) to implement some aspects. The system 502 can implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and/or one or more components supported by the systems described herein. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein (e.g., a query manager 423, a query alteration generator 424, a bottleneck identifier 425, a query alteration optimizer 426, etc.).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated configuration, the visual indicator 520 is a light emitting diode (LED) and the audio transducer 525 is a speaker. These devices may be directly coupled to the power supply 570 so that when activated, they remain on for a duration dictated by the notification mechanism even though the processor 560/561 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with aspects of the present disclosure, the microphone may also serve as an audio sensor to facilitate control of notifications, as will be described below. The system 502 may further include a video interface 576 that enables an operation of an on-board camera to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, the computing device 604, 606, 608 may represent the computing device 120 of FIG. 1, and the server device 602 may represent the server 130 of FIG. 1.

In some aspects, one or more of a query manager 620, a query alteration generator 622, a bottleneck identifier 624, and a query alteration optimizer 626, may be employed by server device 602. The server device 602 may provide data to and from a client computing device such as a personal computer 604, a tablet computing device 606 and/or a mobile computing device 608 (e.g., a smart phone) through a network 612. By way of example, the computer system described above may be embodied in a personal computer 604, a tablet computing device 606 and/or a mobile computing device 608 (e.g., a smart phone). Any of these aspects of the computing devices may obtain content from the store 616, in addition to receiving graphical data useable to be either pre-processed at a graphic-originating system, or post-processed at a receiving computing system. The content store may include slide layout database 618.

FIG. 6 illustrates an exemplary mobile computing device 608 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

In accordance with at least one example of the present disclosure, a method for resolving a performance bottleneck of a query search to improve search results is provided. The method may include receiving a user search query from a user, generating query alteration candidates based on the user search query, determining whether the user search query includes a bottleneck term that is likely to cause the performance bottleneck of the query search, wherein the bottleneck term includes one or more words or phrases, optimizing, in response to determining that the user search query includes the bottleneck term, the query alteration candidates to resolve the performance bottleneck, generating search results based on the optimized query alteration candidates, and providing the search results to the user.

In accordance with at least one aspect of the above method, the method may include where determining whether the user search query includes the bottleneck term comprises determining whether the user search query includes a searchable term that has a frequency count exceeding a predetermined bottleneck threshold, and identifying, in response to determining that the frequency count of the searchable term does not exceed the predetermined bottleneck threshold, the searchable term as the bottleneck term that is likely to return no result and cause the performance bottleneck of the query search.

In accordance with at least one aspect of the above method, the method may include where the frequency count of the searchable term indicates how often the searchable term was included in previous search queries that returned search results.

In accordance with at least one aspect of the above method, the method may further include updating the frequency counts of the searchable terms associated with one or more query alteration candidates from the optimized query alteration candidates that were used to return the search result.

In accordance with at least one aspect of the above method, the method may include where optimizing the query alteration candidates to resolve the performance bottleneck comprises selecting one or more query alteration candidates that include searchable terms that have frequency counts exceeding the predetermined bottleneck threshold.

In accordance with at least one aspect of the above method, the method may include where optimizing the query alteration candidates to resolve the performance bottleneck comprises determining whether the query alteration candidates include the identified bottleneck term in the user query, determining, in response to determining that the query alteration candidates does not include the identified bottleneck term in the user query, whether the query alteration candidates create a new performance bottleneck, updating confidence scores of the query alteration candidates, and selecting, in response to determining that the query alteration candidates does not create a new performance bottleneck, one or more query alteration candidates to generate the optimized query alteration candidates based on the confidence scores.

In accordance with at least one aspect of the above method, the method may further include comprising generating, in response to determining that the query alteration candidates include the identified bottleneck term, a notification to the user, wherein the notification indicates that the user query cannot return search results because of the identified bottleneck term in the user query.

In accordance with at least one aspect of the above method, the method may further include generating in response to determining that the query alteration candidates create the new performance bottleneck, a notification to the user, wherein the notification indicates that the user query cannot return search results because of the identified bottleneck term in the user query.

In accordance with at least one aspect of the above method, the method may include where generating query alteration candidates based on the user search query comprises generating query alteration candidates based on the user search query using an index-based language model.

In accordance with at least one aspect of the above method, the method may further include updating the index-based language model by updating confidence scores associated with the query alteration candidates.

In accordance with at least one example of the present disclosure, a computing device for resolving a performance bottleneck of a query search to improve search results is provided. The computing device may include a processor and a memory having a plurality of instructions stored thereon that, when executed by the processor, causes the computing device to receive a user search query from a user, generate query alteration candidates based on the user search query using an index-based language model, determine whether the user search query includes a bottleneck term that is likely to cause the performance bottleneck of the query search, wherein the bottleneck term includes one or more words or phrases, optimize, in response to determination that the user search query includes the bottleneck term, the query alteration candidates to resolve the performance bottleneck, update the index-based language model by updating confidence scores associated with the query alteration candidates, generate search results based on the optimized query alteration candidates, and provide the search results to the user.

In accordance with at least one aspect of the above computing device, the computing device may comprise where to determine whether the user search query includes the bottleneck term includes to determine whether the user search query includes a searchable term that has a frequency count exceeding a predetermined bottleneck threshold, and identify, in response to determination that the frequency count of the searchable term does not exceed the predetermined bottleneck threshold, the searchable term as the bottleneck term that is likely to return no result and cause the performance bottleneck of the query search.

In accordance with at least one aspect of the above computing device, the computing device may comprise where the frequency count of the searchable term indicates how often the searchable term was included in previous search queries that returned search results.

In accordance with at least one aspect of the above computing device, the computing device may be configured to update the frequency counts of the searchable terms associated with one or more query alteration candidates from the optimized query alteration candidates that were used to return the search result.

In accordance with at least one aspect of the above computing device, the computing device may comprise where to optimize the query alteration candidates to resolve the performance bottleneck comprises to select one or more query alteration candidates that include searchable terms that have frequency counts exceeding the predetermined bottleneck threshold.

In accordance with at least one aspect of the above computing device, the computing device may include where to optimize the query alteration candidates to resolve the performance bottleneck includes comprises determine whether the query alteration candidates include the identified bottleneck term in the user query, determine, in response to determination that the query alteration candidates does not include the identified bottleneck term in the user query, whether the query alteration candidates create a new performance bottleneck, update confidence scores of the query alteration candidates, and select, in response to determination that the query alteration candidates does not create a new performance bottleneck, one or more query alteration candidates to generate the optimized query alteration candidates based on the confidence scores.

In accordance with at least one example of the present disclosure, a non-transitory computer-readable medium storing instructions for resolving a performance bottleneck of a query search to improve search results is provided. The instructions when executed by one or more processors of a computing device, cause the computing device to receive a user search query from a user, generate query alteration candidates based on the user search query, determine whether the user search query includes a bottleneck term that is likely to cause the performance bottleneck of the query search, wherein the bottleneck term includes one or more words or phrases, optimize, in response to determination that the user search query includes the bottleneck term, the query alteration candidates to resolve the performance bottleneck, generate search results based on the optimized query alteration candidates, and provide the search results to the user.

In accordance with at least one aspect of the above non-transitory computer-readable medium, the instructions when executed by one or more processors of a computing device may include where to determine whether the user search query includes the bottleneck term comprises to: determine whether the user search query includes a searchable term that has a frequency count exceeding a predetermined bottleneck threshold, and identify, in response to determination that the frequency count of the searchable term does not exceed the predetermined bottleneck threshold, the searchable term as the bottleneck term that is likely to return no result and cause the performance bottleneck of the query search.

In accordance with at least one aspect of the above non-transitory computer-readable medium, the instructions when executed by one or more processors of a computing device may include where to optimize the query alteration candidates to resolve the performance bottleneck comprises to select one or more query alteration candidates that include searchable terms that have frequency counts exceeding the predetermined bottleneck threshold.

In accordance with at least one aspect of the above non-transitory computer-readable medium, the instructions when executed by one or more processors of a computing device may include where to optimize the query alteration candidates to resolve the performance bottleneck comprises to: determine whether the query alteration candidates include the identified bottleneck term in the user query, determine, in response to determination that the query alteration candidates does not include the identified bottleneck term in the user query, whether the query alteration candidates create a new performance bottleneck, update confidence scores of the query alteration candidates, and select, in response to determination that the query alteration candidates does not create a new performance bottleneck, one or more query alteration candidates to generate the optimized query alteration candidates based on the confidence scores.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The invention claimed is:

1. A method for resolving a performance bottleneck of a query search to improve search results, the method comprising:
   receiving a user search query from a user;
   generating query alteration candidates based on the user search query;
   determining whether the user search query includes a bottleneck term that is likely to cause the performance bottleneck of the query search and includes one or more words or phrases, the determining further comprises identifying a searchable term having a frequency that does not exceed a predetermined bottleneck threshold and that is likely to return no result, thereby acting as the bottleneck term for the query search;
   optimizing, in response to determining that the user search query includes the bottleneck term, the query alteration candidates to resolve the performance bottleneck by selecting, based on a set of confidence score that each correspond to a query alteration candidate, a query alteration candidate from the query alteration candidates that omits the identified bottleneck term and does not include a new performance bottleneck;
   generating search results based on the optimized query alteration candidates; and
   providing the search results to the user.

2. The method of claim 1, wherein the frequency count of the searchable term indicates how often the searchable term was included in previous search queries that returned search results.

3. The method of claim 1, further comprising updating the frequency counts of the searchable terms associated with one or more query alteration candidates from the optimized query alteration candidates that were used to return the search result.

4. The method of claim 1, wherein optimizing the query alteration candidates to resolve the performance bottleneck includes selecting one or more query alteration candidates that include searchable terms that have frequency counts exceeding the predetermined bottleneck threshold.

5. The method of claim 1, wherein optimizing the query alteration candidates to resolve the performance bottleneck includes:
   determining whether the query alteration candidates include the identified bottleneck term in the user query;
   determining, in response to determining that the query alteration candidates does not include the identified bottleneck term in the user query, whether the query alteration candidates create a new performance bottleneck; and
   updating confidence scores of the query alteration candidates.

6. The method of claim 5, further comprising generating, in response to determining that the query alteration candidates include the identified bottleneck term, a notification to the user, the notification indicates that the user query cannot return search results because of the identified bottleneck term in the user query.

7. The method of claim 5, further comprising generating in response to determining that the query alteration candidates create the new performance bottleneck, a notification to the user, wherein the notification indicates that the user query cannot return search results because of the identified bottleneck term in the user query.

8. The method of claim 1, wherein generating query alteration candidates based on the user search query includes generating query alteration candidates based on the user search query using an index-based language model.

9. The method of claim 8, further comprising updating the index-based language model by updating confidence scores associated with the query alteration candidates.

10. The method of claim 1, wherein a notification is generated to the user and the confidence scores are updated when the new performance bottleneck is created.

11. A computing device for resolving a performance bottleneck of a query search to improve search results, the computing device comprising:
a processor; and
a memory having a plurality of instructions stored thereon that, when executed by the processor, causes the computing device to:
receive a user search query from a user;
generate query alteration candidates based on the user search query using an index-based language model;
determine whether the user search query includes a bottleneck term that is likely to cause the performance bottleneck of the query search and includes one or more words or phrases, the determining further comprises identifying, in response to determination that the frequency count of the searchable term does not exceed the predetermined bottleneck threshold, the searchable term as the bottleneck term that is likely to return no result and cause the performance bottleneck of the query search;
optimize, in response to determination that the user search query includes the bottleneck term, the query alteration candidates to resolve the performance bottleneck by selecting, based on a set of confidence score that each correspond to a query alteration candidate, a query alteration candidate from the query alteration candidates that omits the identified bottleneck term and does not include a new performance bottleneck;
update the index-based language model by updating confidence scores associated with the query alteration candidates;
generate search results based on the optimized query alteration candidates; and
provide the search results to the user.

12. The computing device of claim 11, wherein the frequency count of the searchable term indicates how often the searchable term was included in previous search queries that returned search results.

13. The computing device of claim 11, wherein the computing device is further configured to update the frequency counts of the searchable terms associated with one or more query alteration candidates from the optimized query alteration candidates that were used to return the search result.

14. The computing device of claim 11, wherein to optimize the query alteration candidates to resolve the performance bottleneck includes to select one or more query alteration candidates that include searchable terms that have frequency counts exceeding the predetermined bottleneck threshold.

15. The computing device of claim 14, wherein to optimize the query alteration candidates to resolve the performance bottleneck includes:

determine whether the query alteration candidates include the identified bottleneck term in the user query;
determine, in response to determination that the query alteration candidates does not include the identified bottleneck term in the user query, whether the query alteration candidates create a new performance bottleneck; and
update confidence scores of the query alteration candidates.

16. A computer-readable storage medium storing instructions for resolving a performance bottleneck of a query search to improve search results, the instructions when executed by one or more processors of a computing device, cause the computing device to:
receive a user search query from a user;
generate query alteration candidates based on the user search query;
determine whether the user search query includes a bottleneck term that is likely to cause the performance bottleneck of the query search and includes one or more words or phrases, the determining further comprises identifying, in response to determination that the frequency count of the searchable term does not exceed the predetermined bottleneck threshold, the searchable term as the bottleneck term that is likely to return no result and cause the performance bottleneck of the query search;
optimize, in response to determination that the user search query includes the bottleneck term, the query alteration candidates to resolve the performance bottleneck by selecting, based on a set of confidence score that each correspond to a query alteration candidate, a query alteration candidate from the query alteration candidates that omits the identified bottleneck term and does not include a new performance bottleneck;
generate search results based on the optimized query alteration candidates; and
provide the search results to the user.

17. The computing device of claim 11, wherein a notification is generated to the user and the confidence scores are updated when the new performance bottleneck is created.

18. The computer-readable storage medium of claim 16, wherein to optimize the query alteration candidates to resolve the performance bottleneck includes to select one or more query alteration candidates that include searchable terms that have frequency counts exceeding the predetermined bottleneck threshold.

19. The computer-readable storage medium of claim 18, wherein to optimize the query alteration candidates to resolve the performance bottleneck includes to:
determine whether the query alteration candidates include the identified bottleneck term in the user query;
determine, in response to determination that the query alteration candidates does not include the identified bottleneck term in the user query, whether the query alteration candidates create a new performance bottleneck; and
update confidence scores of the query alteration candidates.

20. The computer-readable storage medium of claim 16, wherein a notification is generated to the user and confidence scores are updated when the new performance bottleneck is created.

* * * * *